(12) United States Patent
Roudaut et al.

(10) Patent No.: US 10,185,410 B2
(45) Date of Patent: Jan. 22, 2019

(54) MANUAL DEVICE INCLUDING A REMOVABLE ENDPIECE FOR A CAPACITIVE SCREEN

(71) Applicant: SOCIETE BIC, Clichy (FR)

(72) Inventors: Etienne Roudaut, Paris (FR); Arnaud Bez, Garches (FR)

(73) Assignee: SOCIETE BIC, Clichy (FR)

( * ) Notice: Subject to any disclaimer, the term of this patent is extended or adjusted under 35 U.S.C. 154(b) by 21 days.

(21) Appl. No.: 15/101,152

(22) PCT Filed: Nov. 27, 2014

(86) PCT No.: PCT/FR2014/053057
§ 371 (c)(1),
(2) Date: Jun. 2, 2016

(87) PCT Pub. No.: WO2015/082806
PCT Pub. Date: Jun. 11, 2015

(65) Prior Publication Data
US 2016/0370888 A1    Dec. 22, 2016

(30) Foreign Application Priority Data
Dec. 2, 2013 (FR) ................................. 13 61920

(51) Int. Cl.
*G06F 3/033* (2013.01)
*G06F 3/0354* (2013.01)
(Continued)

(52) U.S. Cl.
CPC .......... *G06F 3/03545* (2013.01); *B43K 29/00* (2013.01); *B43K 29/18* (2013.01); *G06F 3/044* (2013.01)

(58) Field of Classification Search
CPC .... G06F 3/0354; G06F 3/03545; G06F 3/044; B43K 29/18; B43K 29/00
See application file for complete search history.

(56) References Cited

U.S. PATENT DOCUMENTS 4,780,016 A * 10/1988 Kim ..................... B43K 23/10
401/116
8,079,767 B2 * 12/2011 Rolion ................. B43K 24/026
401/107
(Continued)

FOREIGN PATENT DOCUMENTS

CN    103150039    6/2013
CN    203070227    7/2013
(Continued)

OTHER PUBLICATIONS

International Search Report dated Feb. 5, 2015 from International Application No. PCT/FR2014/053057, 8 pages.
(Continued)

*Primary Examiner* — Vijay Shankar
(74) *Attorney, Agent, or Firm* — Ohlandt, Greeley, Ruggiero & Perle, L.L.P.

(57) ABSTRACT

A manual device comprising a body and a removable endpiece including a pad for a capacitive screen, the removable endpiece being assembled to the body by a bayonet connection, the pad and at least a portion of the body being electrically in contact with each other.

11 Claims, 8 Drawing Sheets

(51) Int. Cl.
*B43K 29/00* (2006.01)
*B43K 29/18* (2006.01)
*G06F 3/044* (2006.01)

(56) References Cited

U.S. PATENT DOCUMENTS

| | | | |
|---|---|---|---|
| 8,139,049 B1 | 3/2012 | Brandon et al. | |
| 8,641,308 B2* | 2/2014 | Peyton | B43K 7/00 |
| | | | 401/107 |
| 9,539,848 B2* | 1/2017 | Bez | B43K 7/12 |
| 9,719,759 B2* | 8/2017 | Bergen | F42B 3/06 |
| 9,879,958 B2* | 1/2018 | Carey | F42B 3/06 |
| 2006/0115314 A1* | 6/2006 | Salvadori | B43K 5/17 |
| | | | 401/108 |
| 2010/0074670 A1* | 3/2010 | Rolion | B43K 23/12 |
| | | | 401/68 |
| 2011/0316815 A1* | 12/2011 | Fang | G06F 3/03545 |
| | | | 345/179 |
| 2012/0194484 A1 | 8/2012 | Lehman | |
| 2013/0106793 A1 | 5/2013 | Lai | |
| 2014/0002422 A1 | 1/2014 | Stern et al. | |
| 2014/0028636 A1* | 1/2014 | Zhang | G06F 3/033 |
| | | | 345/179 |
| 2015/0043957 A1* | 2/2015 | Bez | B43K 7/12 |
| | | | 401/116 |
| 2016/0216786 A1* | 7/2016 | Rolion | B43K 29/00 |
| 2018/0120068 A1* | 5/2018 | Carey | F42B 3/06 |

FOREIGN PATENT DOCUMENTS

| | | |
|---|---|---|
| JP | 2012-88888 | 5/2012 |
| JP | 2013-214273 | 10/2013 |
| WO | 2012/094633 A1 | 7/2012 |
| WO | 2013/140062 A1 | 9/2013 |

OTHER PUBLICATIONS

Written Opinion dated Feb. 5, 2015 from International Application No. PCT/FR2014/053051, 5 pages.
First Chinese Office Action dated Jul. 3, 2018 in corresponding Chinese Patent Application No. 201480065919.7, 14 pages.
Japanese Office Action dated Aug. 7, 2018 in corresponding Japanese Patent Application No. 2016-535643, 5 pages.

* cited by examiner

MANUAL DEVICE INCLUDING A REMOVABLE ENDPIECE FOR A CAPACITIVE SCREEN

BACKGROUND OF THE DISCLOSURE

1. Field of the Disclosure

The invention relates to a manual device including an endpiece for a capacitive screen. Such an endpiece for a capacitive screen is suitable for interfering/interacting with the capacitive screen in such a manner that the presence of the endpiece at a given point of said capacitive screen is detectable by the screen. For example, the capacitive screen may be the screen of a multimedia tablet or of a mobile telephone.

2. Description of the Related Art

In order to use a capacitive screen, it is often necessary to have a capacitive screen stylus. Nevertheless, such a stylus is a specific instrument having a single head for a predetermined capacitive screen, and it is expensive.

SUMMARY OF THE DISCLOSURE

An embodiment relates to a manual device comprising a body and a removable endpiece including a pad for a capacitive screen, said removable endpiece (or "first" removable endpiece) being assembled to the body by a bayonet connection, the pad and at least a portion of the body being electrically in contact with each other.

In the meaning of the invention, the term "body" is used in general manner to designate all of the elements that do not form part of the endpiece.

The body forms all or part of a grip portion of the manual device. The endpiece is configured to enable the user to mount it on the body and use the manual device by manipulating the body in order to use the endpiece. The user can also remove the endpiece from the body by means of the bayonet connection.

It should be recalled that a bayonet connection is a connection between two parts that enables them to be assembled by performing a sequence of two movements, namely a first movement followed by a second movement, the first movement being a movement in translation of one part relative to the other, while the second movement is a movement in rotation of one part relative to the other. In order to separate the parts, a reverse sequence of movements is performed, i.e. firstly a movement in rotation of one part relative to the other, followed by a movement in translation of one part relative to the other.

The term "at least a portion of the body" is used to cover any element of the manual device that does not form part of the endpiece. For example, this element may be an external part of the body, e.g. a grip portion, or it may be an internal part of the body.

A removable endpiece (also referred to below more simply as an "endpiece") is an endpiece that is configured to be mounted onto the body by the user and to be removed therefrom, without requiring any particular effort. In other words, the removable endpiece can take up a mounted position or a removed position. Naturally, the removable endpiece may comprise a single part or a plurality of distinct parts that are assembled.

It can be understood that the pad is a termination configured to interact with a capacitive screen. The pad is electrically conductive (by virtue of the material from which it is fabricated, or by virtue of a coating). The shape, the flexibility/rigidity, and the material(s) of a pad are not limited, providing the pad is capable of interacting with a capacitive screen, i.e. providing contact between the pad and the capacitive screen can be detected by the screen.

Electrical contact between the pad and the body, or a portion of the body, may be direct or indirect. Thus, in a variant, the pad makes direct contact with a portion of the body. In another variant, the pad is electrically in contact with the body or with a portion of the body via an intermediate part. The bayonet connection which provides mechanical contact between the endpiece and the body can also serve to provide satisfactory electrical contact between these portions. In addition, by virtue of the bayonet connection, whereby assembly of the removable endpiece becomes effective only once both the first and the second movements have been performed, which movements are of predefined strokes, it is also ensured that the electrical connection is indeed effective when the endpiece is assembled on the body, with the electrical connection being ensured at least at the end of the stroke of one of these two movements.

Such electrical contact makes it possible to ensure that the capacitive screen is sensitive to the presence of the pad when the user manipulates the manual device in the hand and brings said pad close to the capacitive screen.

Because of the bayonet connection, it is possible to remove the removable endpiece for a capacitive screen and to mount another endpiece for a capacitive screen or indeed an endpiece for some other purpose.

Thus, the manual device is more versatile, or less specific, than the devices known in the state of the art. The overall cost of such a device is less than the combined cost of two distinct conventional devices, each forming a "tool" that is equivalent to one of the endpieces.

In some embodiments, the assembly of the removable endpiece to the body by the bayonet connection is locked by a rotary snap-fitting mechanism.

A snap-fitting mechanism involves assembling two parts by engagement and elastic deformation (generally local deformation, e.g. of a strip, or by overall deformation of the parts involved in the assembly). When the two parts are engaged in the snap-fitted position, they have generally returned to their initial shape and no longer present elastic deformation (or they present a reduced amount of elastic deformation). When the two parts are engaged with each other in the snap-fitted position, they co-operate with each other so as to oppose and possibly block relative movement between said parts in the disengagement direction (the direction opposite to the engagement direction). In the snap-fitted position, the two parts can also co-operate in such a manner as to oppose, or even prevent, relative movements in the direction for continuing engagement beyond the snap-fitted position.

It can be understood that locking by snap-fitting engagement occurs during the rotary movement of the removable endpiece relative to the body during assembly by means of the bayonet connection.

Such locking makes it possible to ensure that the endpiece remains in the mounted position, thereby ensuring that the assembly comprising the endpiece and the body remains intact, and it also provides a degree of comfort in use. Furthermore, the snap-fitting gives the user performing assembly a return force or a return signal indicating that the endpiece has indeed reached the mounted position.

In some embodiments, the manual device includes an azimuth alignment system for the removable endpiece relative to the body for bringing the removable endpiece into azimuth alignment with the body prior to assembly by means of the bayonet connection.

It can be understood that an azimuth alignment system is an assistance system for causing the endpiece to turn relative to the body so that the various elements of the bayonet connection are in alignment so as to be able to perform the first movement in translation for assembly by means of the bayonet connection. For example, the azimuth alignment system presents a helical ramp guiding one or more studs towards an azimuth alignment position. In another example, the azimuth alignment system has two helical ramps of opposite inclination so that when seen in a radial direction they form a general shape that is substantially V-shaped. Naturally, these examples are purely illustrative and non-limiting.

In some embodiments, the pad is electrically in contact with the body via a contactor.

The contactor may be a part that is dedicated solely to providing electrical contact between the pad and the body, or it may be a part that can also be used for one or more other functions. It can be understood that the contactor is a part that is distinct from the pad. For example, the contactor may be a part that also serves to assemble the pad within the endpiece, or a part for fastening the endpiece to the body.

In some embodiments, the endpiece includes a bushing, the endpiece being assembled to the body by means of the bushing.

It can be understood that the bushing is a part for fastening the endpiece on the body. The bushing and the pad may form a single part or they may be two distinct parts. Such a bushing enables the endpiece to be assembled in robust manner on the body. When the bushing and the pad are two distinct parts, the bushing may also serve to hold the pad in satisfactory manner, but that is not essential.

In some embodiments, the bushing is made of conductive plastics.

In some embodiments, at least a portion of the body co-operating with the removable endpiece is made of conductive plastics.

Below, and unless specified to the contrary, the term "conductive" is used to mean "electrically conductive". Conversely, below and unless specified to the contrary, the term "insulating" is used to mean "electrically insulating".

It can be understood that part or all of the body is made of conductive plastics. It can also be understood that at least a portion of the body co-operates with the endpiece, for example but not necessarily the portion of the bayonet connection that forms part of the body may be made of conductive plastics. In a variant, the grip portion of the body is made of conductive plastics. In another variant, an internal portion of the body (i.e. a portion that is not for being held directly in the hand by the user), e.g. an internal rod, is made of conductive plastics. In yet another variant, the body presents an internal portion and a grip portion that are both made of conductive plastics.

A plastics (or polymeric material) is a mixture containing a base material (in general a polymer) that is capable of being molded or shaped, in general while hot and/or under pressure, in order to fabricate a part. For example, the plastics is a thermoplastic. For example, the plastics comprises one or more compounds selected from acrylonitrile butadiene styrene (also known under the acronym ABS), acrylonitrile methyl methacrylate (also known under the acronym AMMA), acrylonitrile styrene acrylate (also known under the acronym ASA), cellulose acetate (also known under the acronym CA), cellulose acetate butyrate (also known under the acronym CAB), cellulose acetate propionate (also known under the acronym CAP), expanded polystyrene (also known under the acronym EPS), ethylene tetrafluoroethylene (also known under the acronym ETFE), ethylene vinyl alcohol (also known under the acronym EVAL or EVOH), perfluoro ethylene propylene (also known under the acronym FEP or PFEP), methyl methacrylate butadiene styrene (also known under the acronym MBS), methyl cellulose (also known under the acronym MC), polyamide (also known under the acronym PA), polycaprolactam (also known under the acronym PA6), polyamide imide (also known under the acronym PAI), polyacrylonitrile (also known under the acronym PAN), polybutene-1 (also known under the acronym PB-1), polybutylene terephthalate or poly(butylene terephthalate) (also known under the acronym PBT), polycarbonate (also known under the acronym PC), polytrichloroethylene (also known under the acronym PCTFE), polyethylene (also known under the acronym PE), high-density polyethylene (also known under the acronym HD-PE), low-density polyethylene (also known under the acronym LD-PE), linear low-density polyethylene (also known under the acronym LLD-PE), ultra high molecular weight polyethylene (also known under the acronym UHMW-PE), polyether block amide (also known under the acronym PEBA), polyestercarbonate (also known under the acronym PEC), polyetheretherketone (also known under the acronym PEEK), polyetherimide (also known under the acronym PEI), polyetherketone (also known under the acronym PEK), poly(ethylene naphthalate) (also known under the acronym PEN), polyethersulfone (also known under the acronym PESU), poly(ethylene terephthalate) (also known under the acronym PET), perfluoroalkoxy (also known under the acronym PFA), polyketone (also known under the acronym PK), polymethyl methacrylate (also known under the acronym PMMA), polymethylpentene (also known under the acronym PMP), polyoxymethylene or polyacetal or polyformaldehyde (also known under the acronym POM), polypropylene or polypropene (also known under the acronym PP), poly(phenylene ether) (also known under the acronym PPE), poly(phenylene oxide) (also known under the acronym PPO), poly(propylene oxide) (also known under the acronym PPDX), poly(phenylene sulfide) (also known under the acronym PPS), polystyrene (also known under the acronym PS), polysulfone (also known under the acronym PSU), polytetrafluoroethylene (also known under the acronym PTFE), polyurethane (also known under the acronym PUR), poly(vinyl acetate) (also known under the acronym PVAc), poly(vinyl alcohol) (also known under the acronym PVAL), polyvinyl chloride (also known under the acronym PVC), polyvinylidene fluoride (also known under the acronym PVDF), poly(vinyl fluoride) (also known under the acronym PVF), styrene acrylonitrile (also known under the acronym SAN), silicone (also known under the acronym SI), styrene maleic anhydride (also known under the acronym SSMA or SMAnh), polyolefin, polyester. More generally, the plastics is for example a synthesized organic polymeric or synthesized organic polymer.

In order to confer a conductive nature on the plastics, the material generally includes a filler. A filler is an additive material that is incorporated in the plastics while fabricating a part, and in this example while fabricating the bushing and/or the body or a portion of the body. Thus, a plastics filled with at least one conductive material is a plastics having at least one conductive material incorporated in the mass of the plastics during fabrication of the part. Because of this conductive material filler, the plastics presents conductive properties. For example, the plastics may be filled with at least 2% by weight of conductive material. For example, the conductive material filler comprises one or more compounds selected from carbon black, carbon nanotubes, or metal fibers and/or particles.

Such conductive plastics are particularly well adapted to fabricating the bushing and the body or a portion of the body on an industrial scale and at low cost.

In some embodiments, the conductive plastics is a plastics filled with carbon black (or filled with particles of carbon black). Carbon black is a conductive filler that presents the advantage of having grains of very small size, and of being easy to fabricate at low cost.

In some embodiments, the body extends in an axial direction and presents a first distal end on which the removable endpiece is mounted.

The longitudinal body (i.e. extending in an axial direction) presents ergonomics that make it easier to handle an endpiece for a capacitive screen.

In some embodiments, the body presents a second distal end opposite from the first distal end, the second distal end presenting a writing tip or the equivalent.

By way of example, the writing tip or the equivalent is a ballpoint, a felt tip, a mechanical pencil, a rigid pointer for a resistive screen, the tip of a punch, or any other endpiece for a manual device.

An embodiment relates to an assembly comprising a manual device in accordance with any of the embodiments described in the present document and at least one second removable endpiece for a capacitive screen configured to be mounted on the body of said manual device in the place of the removable endpiece of the manual device (or "first" endpiece).

Naturally, the second endpiece may be similar to or different from the first endpiece. This assembly is particularly versatile.

BRIEF DESCRIPTION OF THE DRAWINGS

The invention and its advantages can be better understood on reading the following detailed description of various embodiments of the invention given as non-limiting examples. The description refers to the accompanying sheets of figures, in which:

FIG. 1A shows a manual device provided with a removable endpiece for a capacitive screen in the mounted position, while

DETAILED DESCRIPTION OF THE DISCLOSURE

Figure 1A:
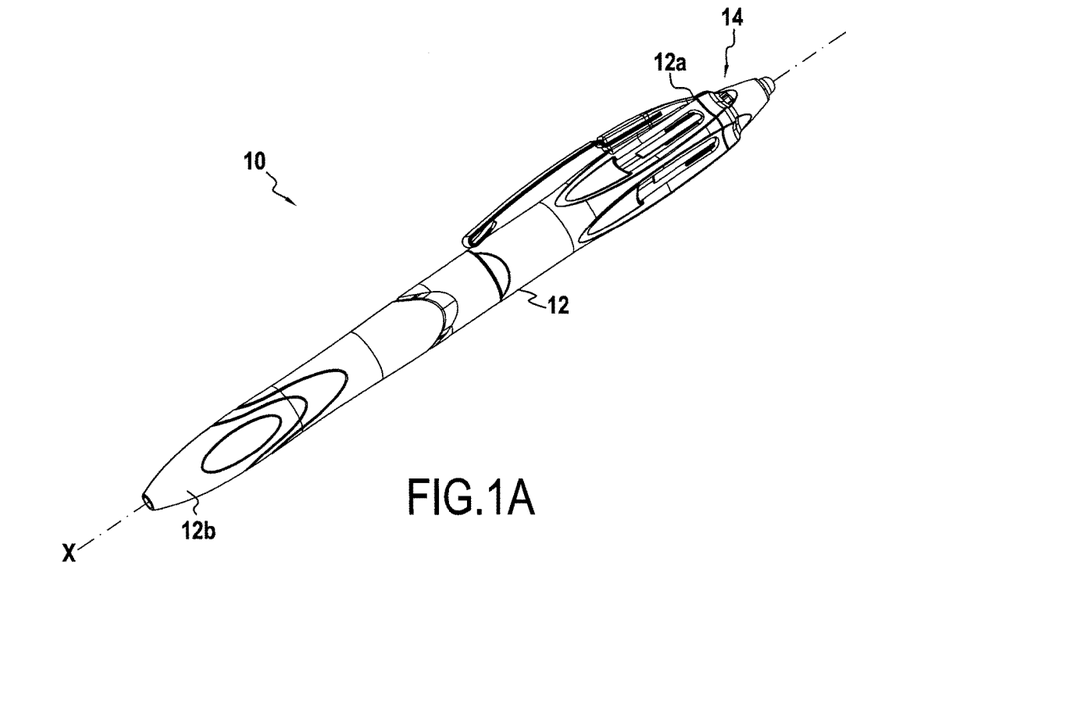

FIG. 1A shows a manual device 10 comprising a body 12 extending longitudinally in an axial direction X, the body 12 having a first distal end 12a and a second distal end 12b that is opposite along the axial direction X from the first distal end 12a.

The first distal end 12a is provided with a removable endpiece 14, while a second distal end 12b is provided with a writing tip (not shown), in this example a ballpoint. Naturally, in a variant, the writing tip could be a mechanical pencil, a felt tip, or the equivalent.

Figure 1B:
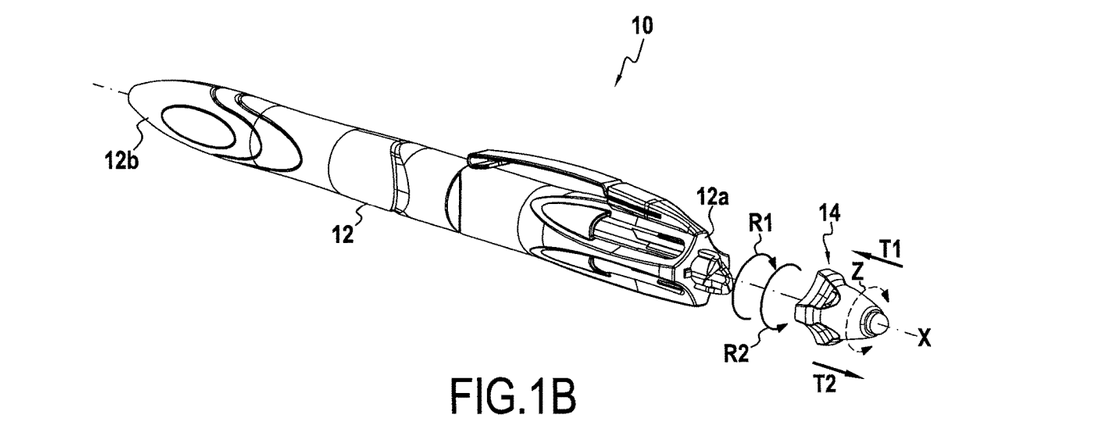
FIG. 1B shows the same manual device with the removable endpiece in the removed position.

FIG. 1B shows the removable endpiece 14 in the removed position, with the endpiece 14 being shown in the mounted position in FIG. 1A. In order to mount the endpiece 14 using the bayonet connection described below, there are performed in sequence: a first movement, namely a movement in translation along the direction X along arrow T1; followed by a second movement, namely a movement in rotation along the azimuth direction Z along arrow R1. In order to remove the endpiece 14, opposite movements are performed in a reverse sequence: namely a movement in rotation is performed first in the azimuth direction Z along arrow R2 in the direction opposite to arrow R1; followed by a movement in translation along the direction X along arrow T2 in the opposite direction to arrow T1. These movements in translation and in rotation are typical of the movements that need to be performed to make an assembly by means of a bayonet connection.

Figure 2A:
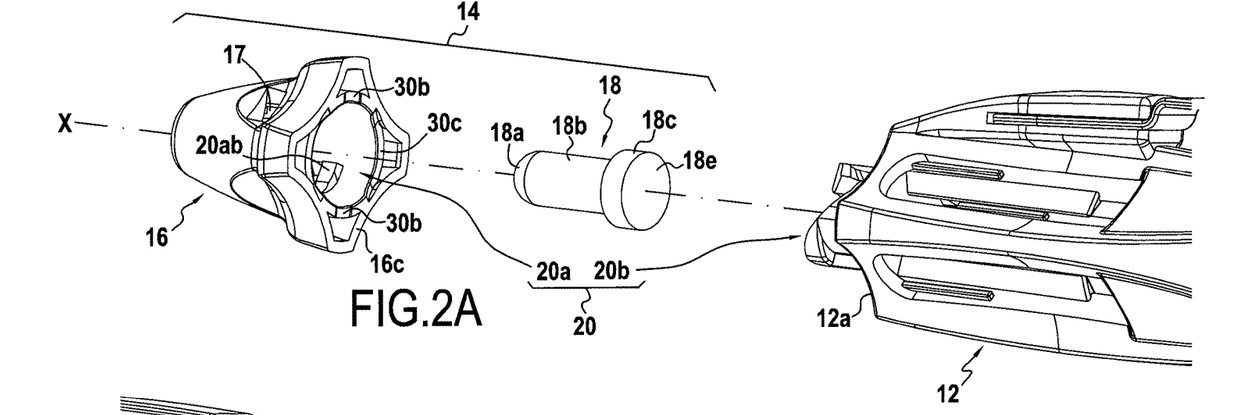
FIGS. 2A and 2B show the manual device of FIG. 1A in part as seen in perspective, the endpiece being shown in exploded view.
Figure 2B:
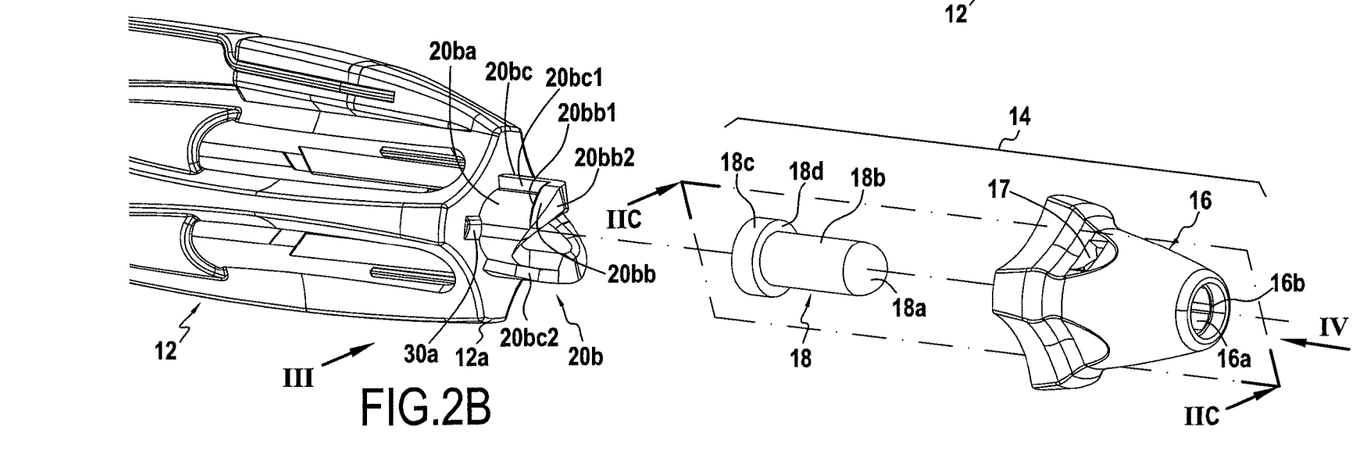
Figure 2C:
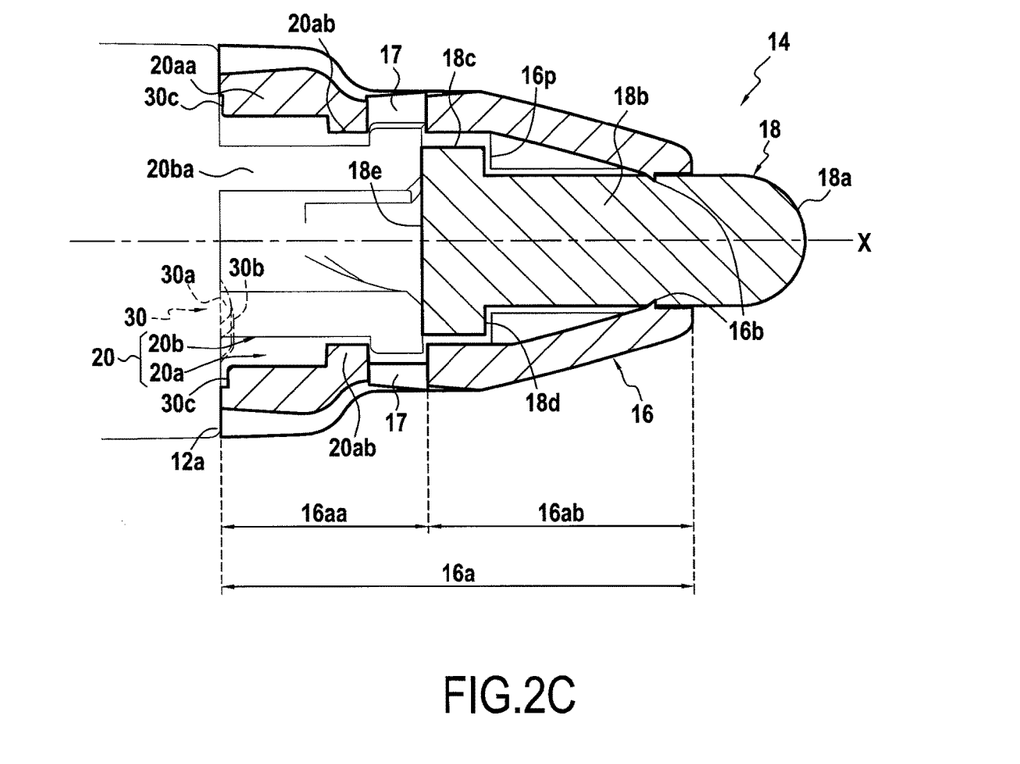
FIG. 2C shows the assembled endpiece in the mounted position in a view in section on plane IIC of FIG. 2B.

The endpiece 14 and the bayonet connection 20 are described below in greater detail with reference to FIGS. 2A, 2B, and 2C.

The endpiece 14 comprises a bushing 16 and a pad 18. The bushing 16 is substantially cylindrical in shape, the pad 18 being engaged in a through axial cavity 16a. In this non-limiting example, the cavity 16a has a substantially cylindrical axial portion 16aa receiving the male portion 20b of the bayonet connection 20 as described below, and a substantially frustoconical axial portion 16ab receiving the pad 18. The bushing 16 is provided with an annular barb 16b on its inside wall, and more particularly on the wall of the substantially frustoconical axial portion 16ab of the cavity 16a, this barb 16b holding the pad 18 inside the cavity 16a. Naturally, the shape of the barb is not limiting. The bushing presents an axial shoulder 16p configured to co-operate by pressing against the pad 18 in the axial direction opposite to the retaining direction of the barb 16b.

The pad 18 presents a distal end 18a for co-operating with a capacitive screen, this end 18a in this example being substantially in the form of a solid hemisphere. The end 18a is in line with a fastener portion 18b that is substantially in the form of a solid cylinder. This fastener portion 18b extends axially between the end 18a and a base 18c. The base 18c forms an annular collar projecting radially outwards from the fastener portion 18b. The face of the collar of the base 18c that is arranged beside the fastener portion 18b forms a shoulder 18d that co-operates in abutment with a shoulder 16p provided in the bushing 16. Thus, by means of the barb 16b and the shoulder 16p, the pad 18 is prevented from moving in translation along the direction X inside the cavity 16, and more particularly inside the portion 16ab of the cavity 16. The proximal end face 18e opposite from the distal end 18a forms a disk-shaped bearing face.

The manual device 10 has a bayonet connection 20 for mounting the endpiece 14 on the body 12. This bayonet connection 20 comprises a female portion 20a arranged in the endpiece 14 and a male portion 20*b* projecting axially from the distal end 12*a* of the body 12.

Figure 4:
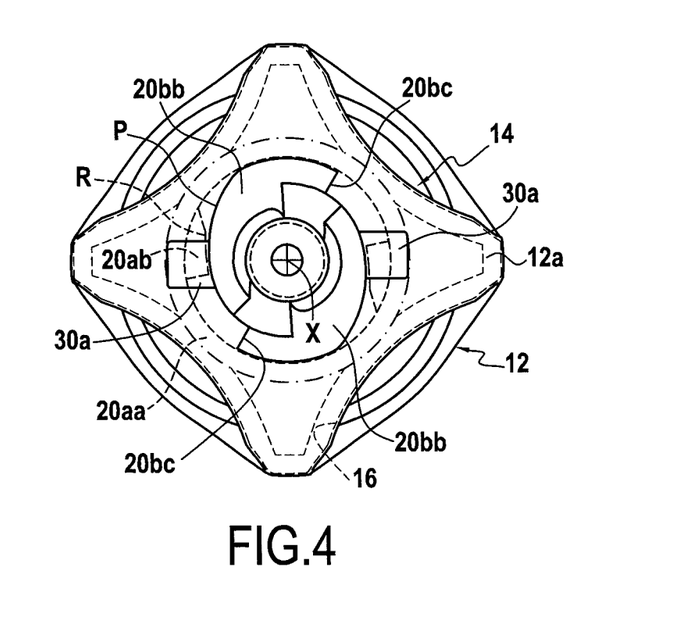
FIG. 4 is a view of the manual device looking along arrow IV of FIG. 2B.

In this example, the female portion 20*a* is formed in the bushing 16 and comprises a skirt 20*aa* defining the substantially cylindrical axial cavity 16*aa* of the bushing 16 and two studs 20*ab* projecting radially from the inside wall of the skirt 20*aa*. The two studs 20*ab* are diametrically opposite and each presents an azimuth ramp R having two slopes (cf. FIG. 4) facilitating co-operation with the male portion 20*b* during the movements in rotation R1 and R2 (cf. FIG. 1B) of the endpiece 14 relative to the body 12 while they are being assembled.

The male portion 20*b* comprises a cylinder 20*ba* extending axially from the distal end 12*a* of the body 12, and two fins 20*bb* extending radially from the distal end of the cylinder 20*ba*. These two fins 20*bb* are diametrically opposite, and when seen looking along arrow IV of FIG. 2B, they present an outer profile P that is radial in part in the form of a portion of a spiral (cf. FIG. 4). Naturally, the variation in the spiral portion may be monotonic or otherwise as a function of azimuth. This spiral-portion shape facilitates co-operation between the fins 20*bb* and the female portion 20*a* during the movements in rotation R1 and R2 (cf. FIG. 1B) of the endpiece 14 relative to the body 12 while they are being assembled.

At the end of the azimuth stroke of the fins 20*bb* in the direction of rotation R1, the cylinder 20*ba* also has azimuth abutments 20*bc* that co-operate in azimuth abutment with the studs 20*ab* of the female portion 20*a*. The two abutments 20*bc* thus limit the movements in rotation along arrow R1 (cf. FIG. 1B), thus making it possible to ensure that the assembly by means of the bayonet connection 20 has been finalized. In this non-limiting example, the azimuth abutments 20*bc* extend axially over the entire axial length of the cylinder 20*ba*. In addition, such abutments 20*bc* that extend axially over the axial length of the cylinder 20*ba* serve to stiffen the cylinder 20*ba*, thus making it stronger against the stresses to which it is subjected, in particular while mounting/removing the endpiece 14.

The bushing 16 presents windows 17 making it possible to verify that the fins 20*bb* are indeed engaged with the studs 20*ab*. These windows 17 also serve to facilitate fabrication by injection molding, in particular in order to form the studs 20*ab*.

Figure 3:
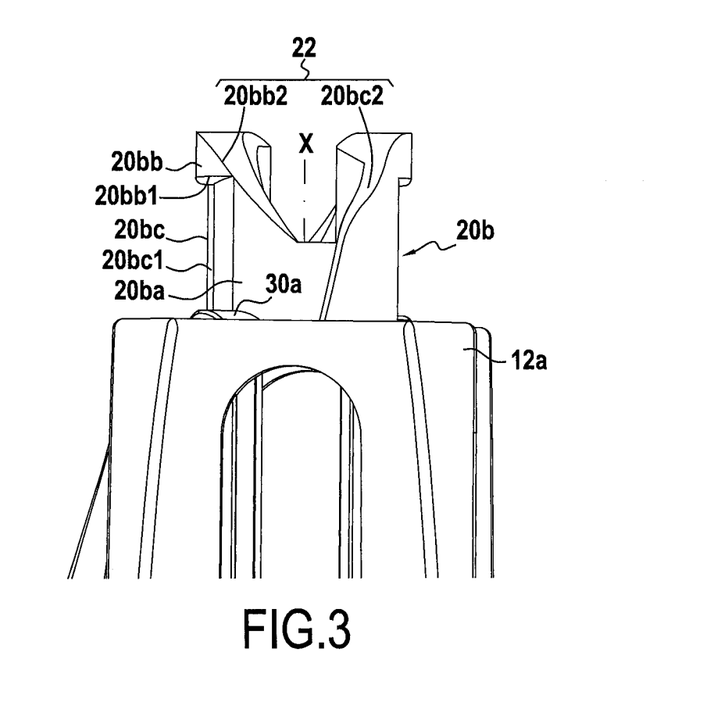
FIG. 3 is a view of the body looking along arrow III of FIG. 2B.

Each fin 20*bb* presents a bottom axial face 20*bb*1 facing the body 12 forming a shoulder that co-operates with the studs 20*ab*, and a top axial face 20*bb*2 that is opposite and facing the endpiece 14. The top axial face 20*bb*2 is inclined relative to the axial direction and forms a first helical ramp (cf. FIG. 3).

In the same manner, each abutment 20*bc* presents a front azimuth face 20*bc*1 forming a shoulder that co-operates in abutment with the studs 20*ab* and an opposite rear azimuth face 20*bc*2. The rear azimuth face 20*bc*2 is inclined relative to the axial direction and forms a second helical ramp (cf. FIG. 3).

The inclination of the faces 20*bb*2 of the fins 20*bb* is oriented to be opposite to the inclination of the faces 20*bc*2 of the abutments 20*bc*. In addition, each face 20*bb*2 of a fin 20*bb* faces in azimuth a face 20*bc*2 of an abutment 20*bc*. Thus, each pair of faces 20*bb*2 and 20*bc*2 substantially forms a V-shape when seen looking along a radial direction (cf. FIG. 3).

The faces 20*bb*2 and 20*bc*2 form an azimuth alignment system 22 for aligning the endpiece 14 relative to the body 12 so as to bring the endpiece 14 and the body 12 into azimuth alignment prior to assembly. This alignment system enables the endpiece 14 to be positioned relative to the body 12 so as to make it possible to perform the movement in translation T1 (cf. FIG. 1B). This alignment system makes it possible to avoid pressing the studs 20*ab* pointlessly against the top axial face 20*bb*2 without being aware that the endpiece 14 and the body 12 are not in a position that allows this movement T1, which would make them fiddly to assemble and would run the risk of causing the studs and/or the fins to be broken off if the user were to push hard in order to perform the movement T1.

It should be observed that the cylinder 20*ba* presents cutouts formed in line with the faces 20*bb*2 and 20*bc*2. These cutouts serve mainly to facilitate fabrication by injection molding and unmolding of the male portion 20*b*.

The manual device 10 presents a rotary snap-fitting mechanism 30 having two diametrically opposite axial projections 30*a* that project axially from the distal end 12*a* of the body, and two diametrically opposite housings 30*b* formed in the face 16*c* of the endpiece 14, and more particularly of the bushing 16, facing the distal end 12*a* of the body 12, each housing 30*b* receiving one of the axial projections 30*a*. It should be observed that the face 16*c* presents azimuth setbacks 30*c* enabling the endpiece 14 to be turned without rubbing against the projections 30*a*. These setbacks 30*c* present ramps on their azimuth ends for facilitating the passage of the projections 30*a* in order to bring them into the housings 30*b*.

In this example, the body 12 and the bushing 16 are made of conductive plastics. In particular, the body 12 and the bushing 16 in this example are made of carbonblack-filled ABS. The pad 18 is made of conductive material, and in this example it is made of carbonblack-filled silicone.

Thus, when the pad 18 is in mechanical contact with the bushing 16, there is electrical contact between the pad 18 and the bushing 16. Furthermore, because of the bayonet connection 20, the bushing 16 is mechanically connected to the body 12. There is thus electrical contact between the bushing 16 and the body 12. Thus, the pad 18 is electrically in contact with the body 12 via the bushing 16, thereby enabling the manual device to interact with a capacitive screen when a user manipulates the manual device in the hand.

In this example, the proximal end face 18*e* of the bushing 18 co-operates by pressing against the distal end of the cylinder 20*ba* of the male portion 20*b* of the bayonet connection 20 (cf. FIG. 3), in such a manner that the pad 18 is also directly in electrical contact with the body 12. Thus, in this particular configuration, it is possible to use a non-conductive material to fabricate the bushing 16 without preventing the manual device 10 from operating properly.

Figures 5A, 5B:
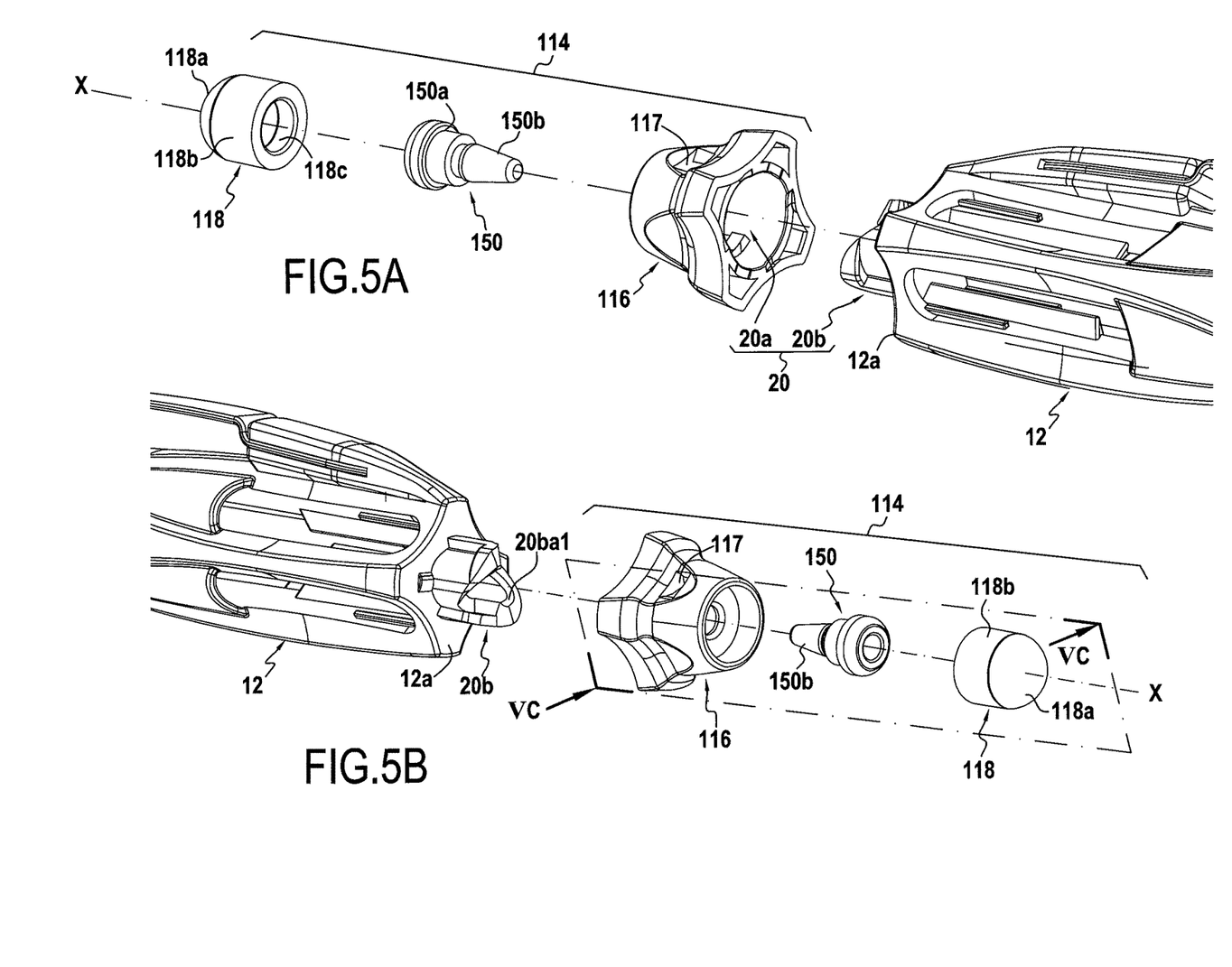
FIGS. 5A and 5B show the manual device in part as seen in perspective and provided with a first variant of the removable endpiece, the endpiece being shown in exploded view.
Figure 5C:
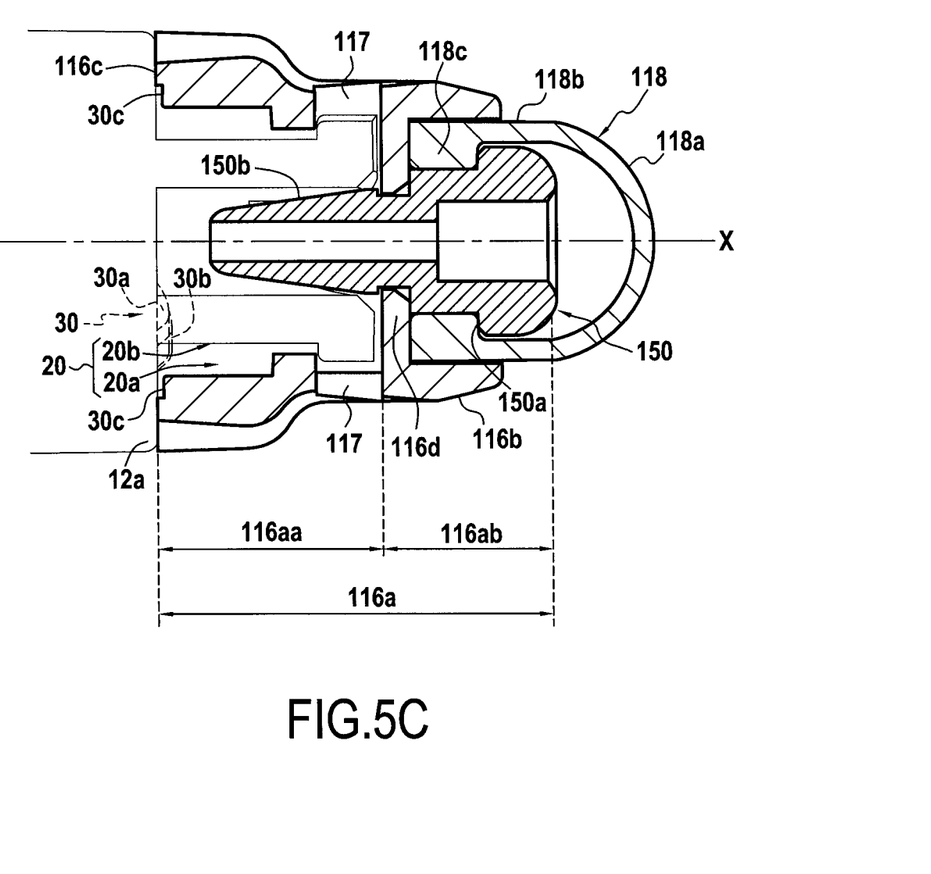
FIG. 5C shows the assembled endpiece in the mounted position in a view in section on plane VC of FIG. 5B.

A first variant 114 of the removable endpiece 14 is described below with reference to FIGS. 5A, 5B, and 5C. Only the pad and the portion for attaching the pad to the bushing differ from the endpiece 14. In particular, the bayonet connection, the azimuth alignment system, and the rotary snap-fitting mechanism remain similar. Similar portions are given reference signs that are unchanged, while modified portions are given reference signs that have been incremented by 100.

The endpiece 114 presents a pad 118 mounted on a bushing 116 via a contactor 150. More particularly, the pad 118 presents a distal end 118*a* for co-operating with a capacitive screen, this end 118*a* in this example presenting a substantially hollow hemispherical shape. The end 118*a* is arranged in line with a fastener portion 118*b* that is substantially in the shape of a hollow cylinder. This fastener portion 118*b* presents a column 118*c* arranged in the vicinity of the free end of the fastener portion 118b, inside the fastener portion 118b. This collar 118c co-operates by snap-fastening with a shoulder 150a of the contactor 150.

The bushing 116 presents a proximal portion for co-operating with the distal end 12a of the body 12 similar to that of the bushing 16, while the distal portion of the bushing 116 is different. In particular, the bushing 116 presents a through axial cavity 116a having a substantially cylindrical axial portion 116aa similar to the axial portion 16aa of the bushing 16, while the axial portion 116ab receiving the pad 118 is different. The distal axial portion 116ab is substantially cylindrical and receives a portion of the pad 118. This portion 116ab of the cavity 116 is defined by a skirt 116b that locks the snap-fastening between the pad 118 and the contactor 150. An annular wall 116d axially separates the portion 116aa from the portion 116ab.

The connector 150 carrying the pad 118 is snap-fastened to the bushing 116, and more particularly to the annular wall 116d. The connector 150 presents a frustoconical contact plug 150b, this plug 150b co-operating with the distal end of the cylinder 20ba of the male portion 20b of the bayonet connection 20, and more particularly with the inner chamfer 20ba1 of the distal end of the cylinder 20ba. The connector 150 presents a through hole 150c in the axial direction X constituting a vent to balance the pressure inside the volume formed between the pad 118 and the connector 150 and the pressure outside said volume.

The contactor 150 is made of conductive plastics. In this example, the contactor is made of carbonblack-filled ABS. The body 12 and the bushing 116 are also made of conductive plastics, in this example of carbonblack-filled ABS. The pad 118 is made of conductive material, in this example carbonblack-filled silicone.

Thus, as above, the pad 118 is electrically in contact with the body 12 via the bushing 116. In this example, the pad 118 is also electrically in contact with the body 12 via the contactor 150. Thus, as above, it is possible to use a non-conductive material to fabricate the bushing 116 without impeding proper operation of the manual device.

Figures 6A, 6B:
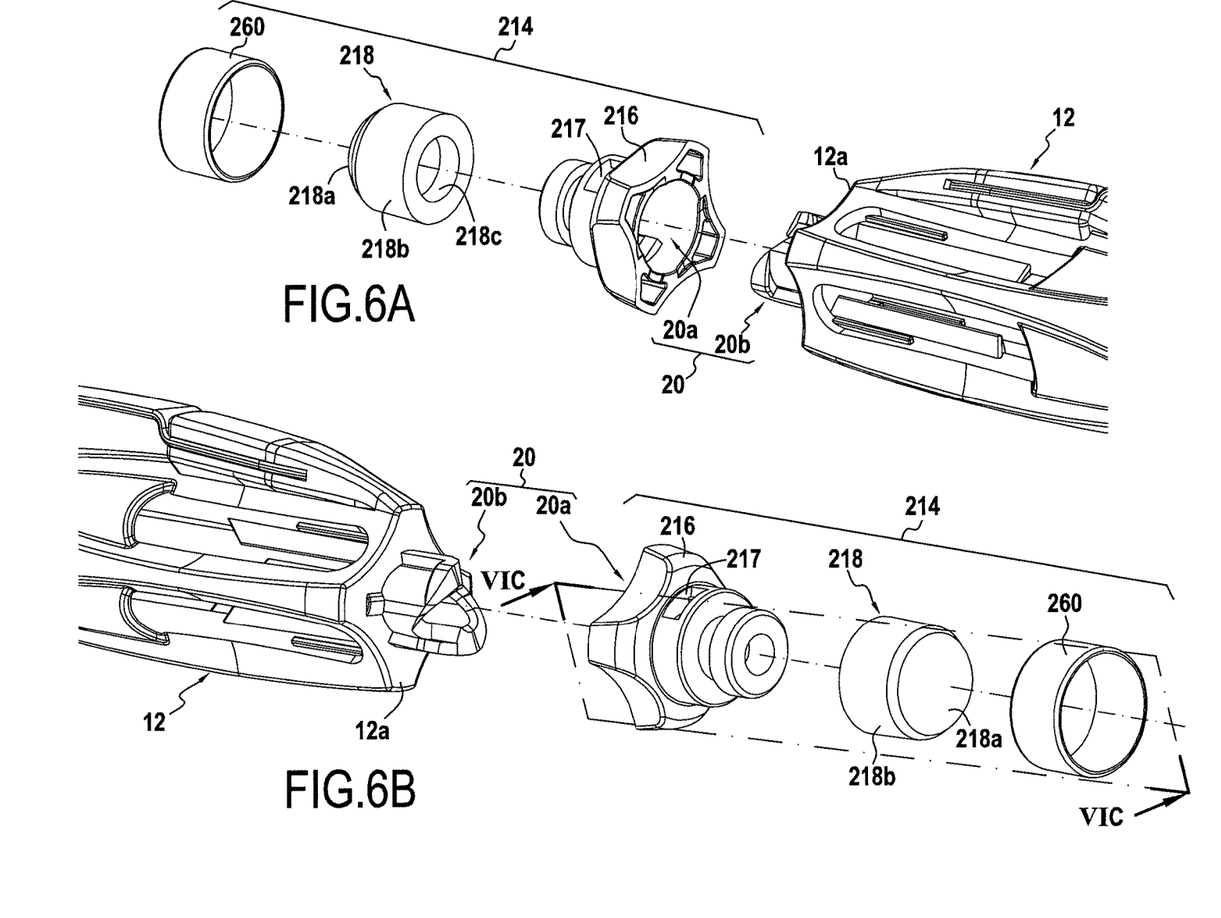
FIGS. 6A and 6B show the manual device in part as seen in perspective and provided with a second variant of the removable endpiece, the endpiece being shown in exploded view.
Figure 6C:
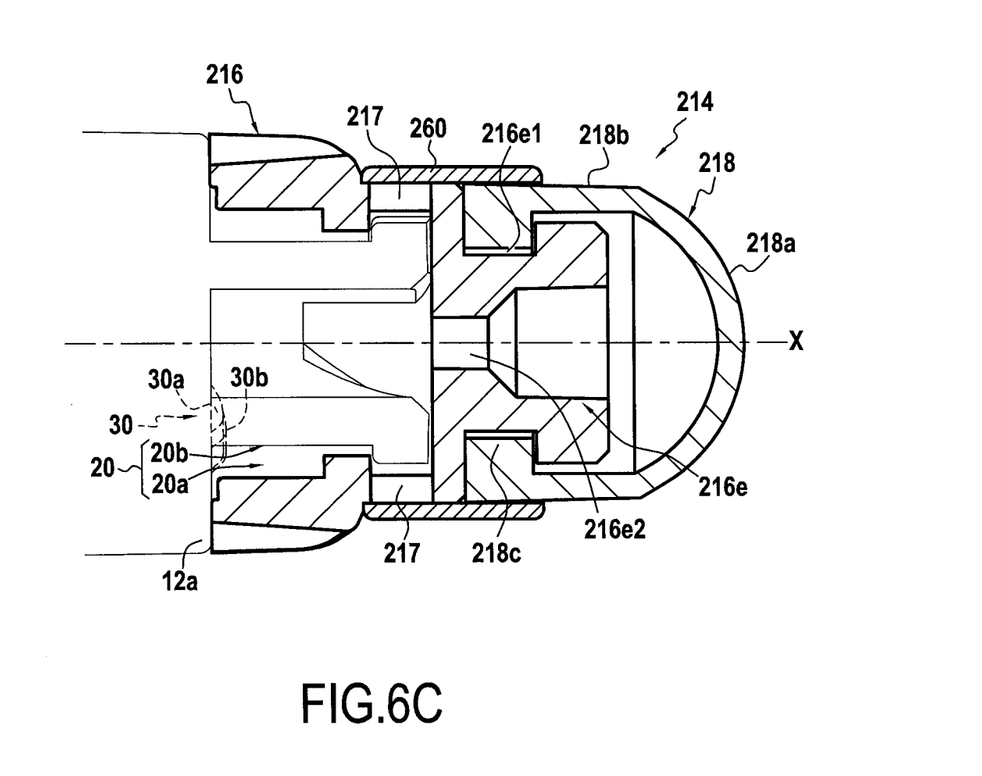
FIG. 6C shows the assembled endpiece in the mounted position in a view in section on plane VIC of FIG. 6B.

A second variant 214 of the removable endpiece 14 is described below with reference to FIGS. 6A, 6B, and 6C. Only the bushing and the portion for attaching the bushing to the pad differ from the endpieces 14 and 114. In particular, the bayonet connection, the azimuth alignment system, and the rotary snap-fitting mechanism are similar. Compared with the endpiece 14, portions that are similar are given unchanged reference signs, while portions that are modified are given reference signs incremented by 200.

The pad 218 is mounted on the bushing 216, and more particularly on a support 216e of the bushing 216. The pad 218 presents a structure similar to the structure of the pad 118 of FIGS. 5A, 5B, and 5C, only with dimensions that are different.

In this second variant, the collar 218c co-operates by snap-fastening with an annular groove 216e1 formed in the support 216e. A ring 260 is forcibly engaged around the fastener portion 218b and the support 216e and is crimped onto the support 216e (cf. FIG. 6C). This ring 260 locks the snap-fastening of the pad 218 on the support 216e and holds the collar 218c in the annular groove 216e1. The support 216e presents a through hole 216e2 along the axial direction X forming a vent for balancing the pressure inside the volume formed between the pad 218 and the support 216e with the pressure outside said volume.

The body 12 and the bushing 216 are made of conductive plastics, in this example of carbonblack-filled ABS. The pad 218 is made of conductive material, in this example of carbonblack-filled silicone. The ring 260 is made of chromium-plated copper. Thus, the pad 218 is electrically in contact with the body 12 via the bushing 216. Since the ring 260 is made of metal, it also contributes to electrical contact between the support 216e and the pad 218, however its main function is to hold the pad 218 mechanically on the support 216e.

Since the portions constituting the bayonet connection, the azimuth alignment system, and the rotary snap-fitting mechanism of the endpieces 14, 114, and 214 are similar and compatible with the body 12, a user need only have one manual device body 12 in order to use all of these endpieces, thereby obtaining a versatile manual device. In the present example, the diameter of the endpiece 14 (e.g. forming a first endpiece) is smaller than the diameter of the endpiece 114 (e.g. forming a second endpiece), which in turn presents a diameter that is smaller than the diameter of the endpiece 214 (e.g. forming a third endpiece). It is thus possible to select the endpiece that is most suitable for the capacitive screen that it is desired to use.

Although the present invention is described with reference to specific embodiments, it is clear that modifications and changes may be made to these embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A manual device comprising
a body; and
a removable endpiece including a pad for a capacitive screen, said removable endpiece being assembled to the body by a bayonet connection, the pad and at least a portion of the body being electrically in contact with each other, and comprising an azimuth alignment system for the removable endpiece relative to the body for bringing the removable endpiece into azimuth alignment with the body prior to assembly by the bayonet connection.

2. The device according to claim 1, wherein the assembly of the removable endpiece to the body by the bayonet connection is locked by a rotary snap-fitting mechanism.

3. The device according to claim 1, wherein the pad is electrically in contact with the body via a contactor.

4. The device according to claim 1, wherein the endpiece includes a bushing, and wherein the endpiece is assembled to the body by the bushing.

5. The device according to claim 4, wherein the bushing is made of conductive plastics.

6. The device according to claim 1, wherein at least a portion of the body co-operating with the removable endpiece is made of conductive plastics.

7. The device according to claim 5, wherein the conductive plastics is a carbonblack-filled plastics.

8. The device according to claim 6, wherein the conductive plastics is a carbonblack-filled plastics.

9. The device according to claim 1, wherein the body extends in an axial direction and presents a first distal end on which the removable endpiece is mounted.

10. The device according to claim 8, wherein the body presents a second distal end opposite to the first distal end, and wherein the second distal end presents a writing tip or the equivalent.

11. An assembly comprising the manual device according to claim 1 and at least one second removable endpiece for a capacitive screen that is configured to be mounted on the body of the manual device instead of the removable end-piece of the manual device.

* * * * *